United States Patent
Lee et al.

(10) Patent No.: US 11,995,122 B2
(45) Date of Patent: May 28, 2024

(54) ELECTRONIC DEVICE FOR PROVIDING RECOGNITION RESULT OF EXTERNAL OBJECT BY USING RECOGNITION INFORMATION ABOUT IMAGE, SIMILAR RECOGNITION INFORMATION RELATED TO RECOGNITION INFORMATION, AND HIERARCHY INFORMATION, AND OPERATING METHOD THEREFOR

(71) Applicant: Samsung Electronics Co., Ltd., Gyeonggi-do (KR)

(72) Inventors: Sihyoung Lee, Gyeonggi-do (KR); Youngil Shin, Gyeonggi-do (KR); Daehee Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 585 days.

(21) Appl. No.: 17/266,661

(22) PCT Filed: Jun. 21, 2019

(86) PCT No.: PCT/KR2019/007524
§ 371 (c)(1),
(2) Date: Feb. 8, 2021

(87) PCT Pub. No.: WO2020/032383
PCT Pub. Date: Feb. 13, 2020

(65) Prior Publication Data
US 2021/0312179 A1  Oct. 7, 2021

(30) Foreign Application Priority Data
Aug. 8, 2018 (KR) .......................... 10-2018-0092690

(51) Int. Cl.
*G06F 16/583* (2019.01)
*G06V 10/762* (2022.01)
(Continued)

(52) U.S. Cl.
CPC ...... *G06F 16/5854* (2019.01); *G06F 16/5838* (2019.01); *G06V 10/7625* (2022.01);
(Continued)

(58) Field of Classification Search
CPC ............ G06F 16/5854; G06F 16/5838; G06F 18/231; G06V 10/7625; G06V 10/95;
(Continued)

(56) References Cited

U.S. PATENT DOCUMENTS 9,131,207 B2   9/2015  Takagi et al.
9,135,277 B2   9/2015  Petrou
(Continued)

FOREIGN PATENT DOCUMENTS

| JP | 6088381 B2 | 3/2017 |
|---|---|---|
| KR | 10-2013-0055029 A | 5/2013 |
| KR | 10-2014-0121156 A | 10/2014 |
| KR | 10-1768521 B1 | 8/2017 |
| KR | 10-1771044 B1 | 8/2017 |

OTHER PUBLICATIONS

M. Ghazal, T. Basmaji, M. Qasymeh, R. Salim and A. Khalil, "Localized Assistive Scene Understanding using Deep Learning and the IoT," 2019 7th International Conference on Future Internet of Things and Cloud Workshops (FiCloudW), Istanbul, Turkey, 2019, pp. 53-58, doi: 10.1109/FiCloudW.2019.00023. (Year: 2019).*
(Continued)

*Primary Examiner* — Andrae S Allison
(74) *Attorney, Agent, or Firm* — Cha & Reiter, LLC

(57) ABSTRACT

Various embodiments of the disclosure relate to an electronic device for providing a recognition result for an external object by using recognition information for an image, similar recognition information related to recognition information, and hierarchy information, and an operating method thereof. The electronic device may include a camera, a display, a memory, and a processor. The processor may be configured to acquire an image including an external
(Continued)

object by using the camera, generate recognition information for the external object by using the image, acquire similar recognition information generated together with the recognition information as a recognition result of the external object corresponding to the recognition information before the generating operation, acquire hierarchy information corresponding to the recognition information or the similar recognition information, and provide, by using the display, a recognition result for the external object generated by using at least the recognition information, the similar recognition information, and the hierarchy information.

11 Claims, 17 Drawing Sheets

(51) Int. Cl.
*G06V 10/94* (2022.01)
*G06V 20/20* (2022.01)
*G06V 20/68* (2022.01)

(52) U.S. Cl.
CPC .............. *G06V 10/95* (2022.01); *G06V 20/20* (2022.01); *G06V 20/68* (2022.01)

(58) Field of Classification Search
CPC ........ G06V 20/20; G06V 20/68; H04N 23/60; H04N 23/63; G06T 7/11; G06T 2207/20081
See application file for complete search history.

(56) References Cited

U.S. PATENT DOCUMENTS

| | | | | |
|---|---|---|---|---|
| 11,017,263 | B2* | 5/2021 | Kim | G06V 10/147 |
| 11,488,284 | B2* | 11/2022 | Han | G06V 10/147 |
| 2010/0260426 | A1 | 10/2010 | Huang et al. | |
| 2017/0213110 | A1* | 7/2017 | Zhu | G06F 18/24 |
| 2018/0039853 | A1* | 2/2018 | Liu | G06V 10/768 |
| 2018/0220061 | A1* | 8/2018 | Wang | G06N 3/02 |
| 2019/0333198 | A1* | 10/2019 | Wang | G06T 5/50 |
| 2020/0029013 | A1* | 1/2020 | Stanard | H04N 23/661 |
| 2021/0312179 | A1* | 10/2021 | Lee | G06F 16/5838 |
| 2022/0189175 | A1* | 6/2022 | Lee | G06Q 30/0643 |

OTHER PUBLICATIONS

S. Ramiah, T. Y. Liong and M. Jayabalan, "Detecting text based image with optical character recognition for English translation and speech using Android," 2015 IEEE Student Conference on Research and Development (SCOReD), Kuala Lumpur, Malaysia, 2015, pp. 272-277, doi: 10.1109/SCORED.2015.7449339. (Year: 2015).*
Zhu, Kevin. An educational approach to machine learning with mobile applications. Diss. Massachusetts Institute of Technology, Jun. 2019. (Year: 2019).*
Korean Office Action dated Jan. 30, 2023.
Zhao et al.; "Embedding Visual Hierarchy with Deep Networks for Large-Scale Visual Recognition"; Jul. 8, 2017.
Verma et al.; "Learning Hierarchy Similarity Metrics".
Notice of Patent Grant dated Jan. 26, 2024.

* cited by examiner

ELECTRONIC DEVICE FOR PROVIDING RECOGNITION RESULT OF EXTERNAL OBJECT BY USING RECOGNITION INFORMATION ABOUT IMAGE, SIMILAR RECOGNITION INFORMATION RELATED TO RECOGNITION INFORMATION, AND HIERARCHY INFORMATION, AND OPERATING METHOD THEREFOR

CROSS REFERENCE TO RELATED APPLICATIONS

This application is a National Phase Entry of PCT International Application No. PCT/KR2019/007524, which was filed on Jun. 21, 2019, and claims a priority to Korean Patent Application No. 10-2018-0092690, which was filed on Aug. 8, 2018, the contents of which are incorporated herein by reference.

TECHNICAL FIELD

Various embodiments of the disclosure relate to an electronic device for recognition an object included in an image, and an operating method thereof.

BACKGROUND ART

With the advance of information communication techniques and semiconductor techniques, electronic devices are being developed into multimedia devices for providing various multimedia services. For example, the electronic device may provide various services such as a broadcast service, a wireless Internet service, and a music service.

With the development of a vision system which provides a function of recognizing an object included in an image acquired through a camera, the electronic device has recently been utilized in more various fields. For example, the electronic device may recognize the object, based on a preview image acquired through the camera, and may provide a search service related to the recognized object.

DISCLOSURE OF INVENTION

Technical Problem

In general, an object recognition function may be performed by using information (e.g., a feature point) included in an image. For example, a feature point associated with a pre-defined feature may be extracted from the image, and the extracted feature point may be compared with a reference feature point to recognize an object.

However, a method of detecting and recognizing an object by using only information included in an image has a limitation in recognition accuracy, which leads to a problem in that accuracy of a recognition result is decreased.

Various embodiments of the disclosure described below may provide an electronic device for improving a recognition rate of an object in an image, and an operating method thereof.

Solution to Problem

According to various embodiments of the disclosure, an electronic device may include a camera, a display, a memory, and a processor. The processor may be configured to acquire an image including an external object by using the camera, generate recognition information for the external object by using the image, acquire similar recognition information generated together with the recognition information as a recognition result of the external object corresponding to the recognition information before the generating operation, acquire hierarchy information corresponding to the recognition information or the similar recognition information, and provide, by using the display, a recognition result for the external object generated by using at least the recognition information, the similar recognition information, and the hierarchy information.

According to various embodiments, an electronic device may include a communication circuit, a display device, and a processor operatively coupled with the communication circuit and the display device, and a memory operatively coupled with the processor. The memory may store instructions, when executed, causing the processor to extract an object included in an image, acquire a first recognition result for the extracted object, request an external device to provide a second recognition result for the extracted object by using the communication circuit, output at least part of the first recognition result through the display device, and output the second recognition result through the display device, based on reception of the second recognition result.

According to various embodiments of the disclosure, a method of operating an electronic device may include acquiring an image including an external object, generating recognition information for the external object by using the image, acquiring similar recognition information generated together with the recognition information as a recognition result of the external object corresponding to the recognition information before the generating operation, acquiring hierarchy information corresponding to the recognition information or the similar recognition information, and providing a recognition result for the external object generated by using at least the recognition information, the similar recognition information, and the hierarchy information.

Advantageous Effects of Invention

According to various embodiments, an electronic device and an operation thereof can acquire recognition information for a recognized object and related information corresponding to the recognition information, and can generate an object recognition result for the image, based on the acquired information, thereby improving object recognition performance.

BEST MODE FOR CARRYING OUT THE INVENTION

Embodiments of the disclosure will be described herein below with reference to the accompanying drawings. In addition, in the following description, well-known functions or constructions are not described in detail since they would obscure the disclosure in unnecessary detail. Also, the terms used herein are defined according to the functions of the disclosure. Thus, the terms may vary depending on a user's or operator's intention and usage. Therefore is, the terms used herein may be understood based on the descriptions made herein.

Figure 1:
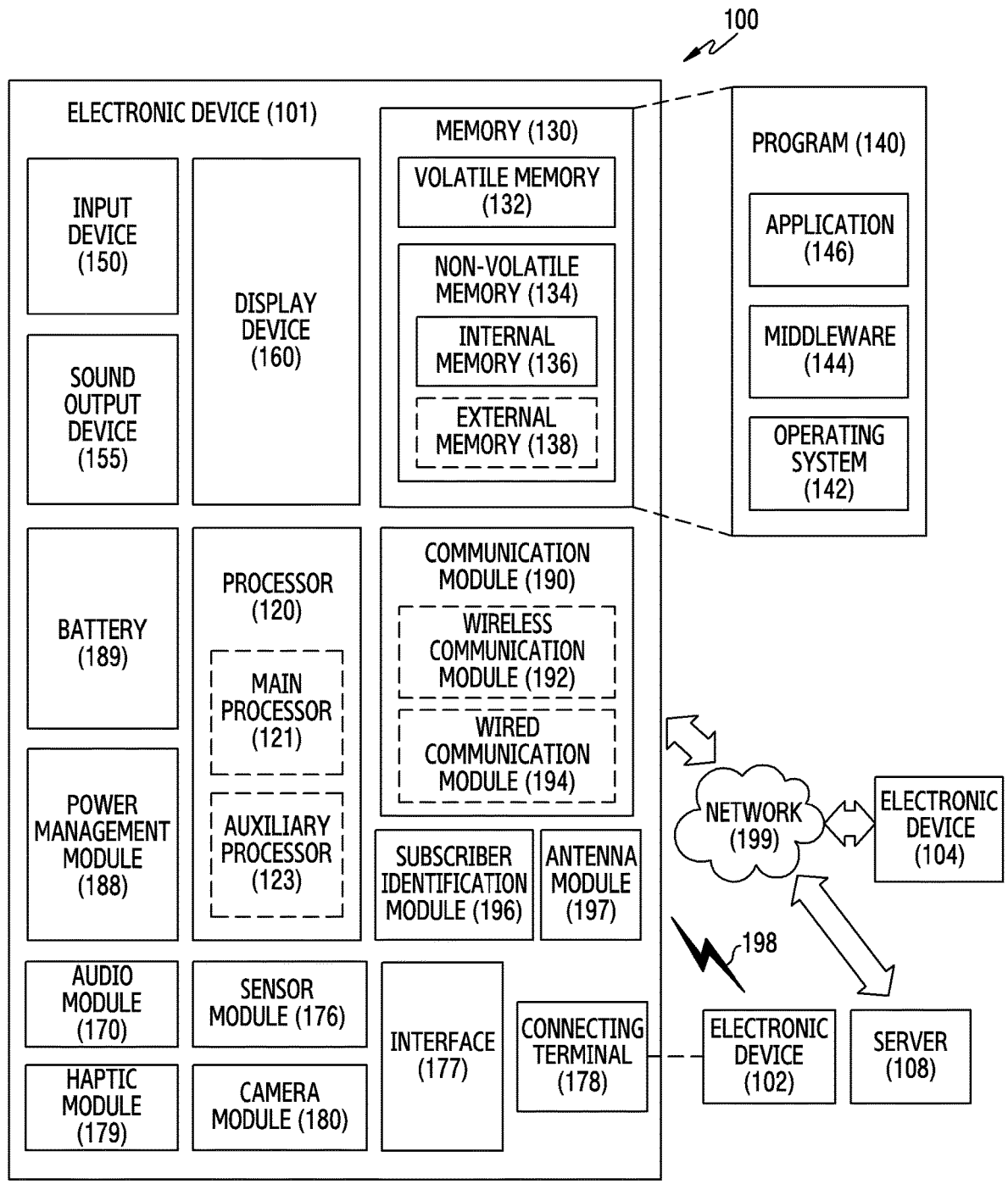
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121. The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
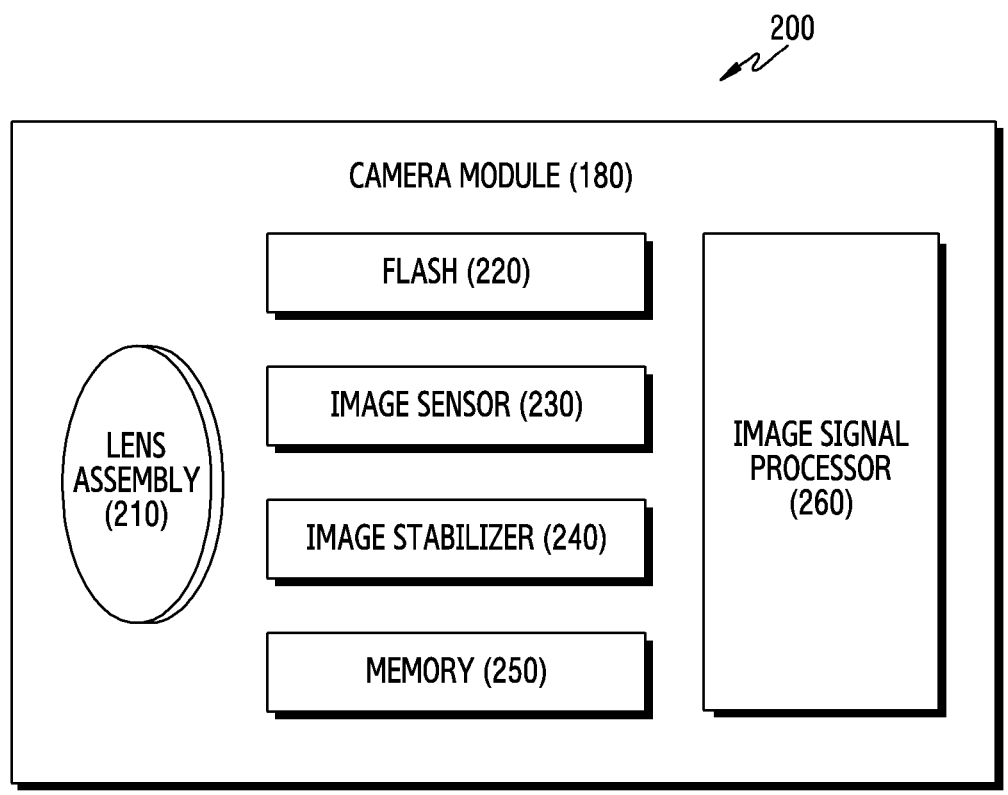
FIG. 2 is a block diagram illustrating a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor. The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
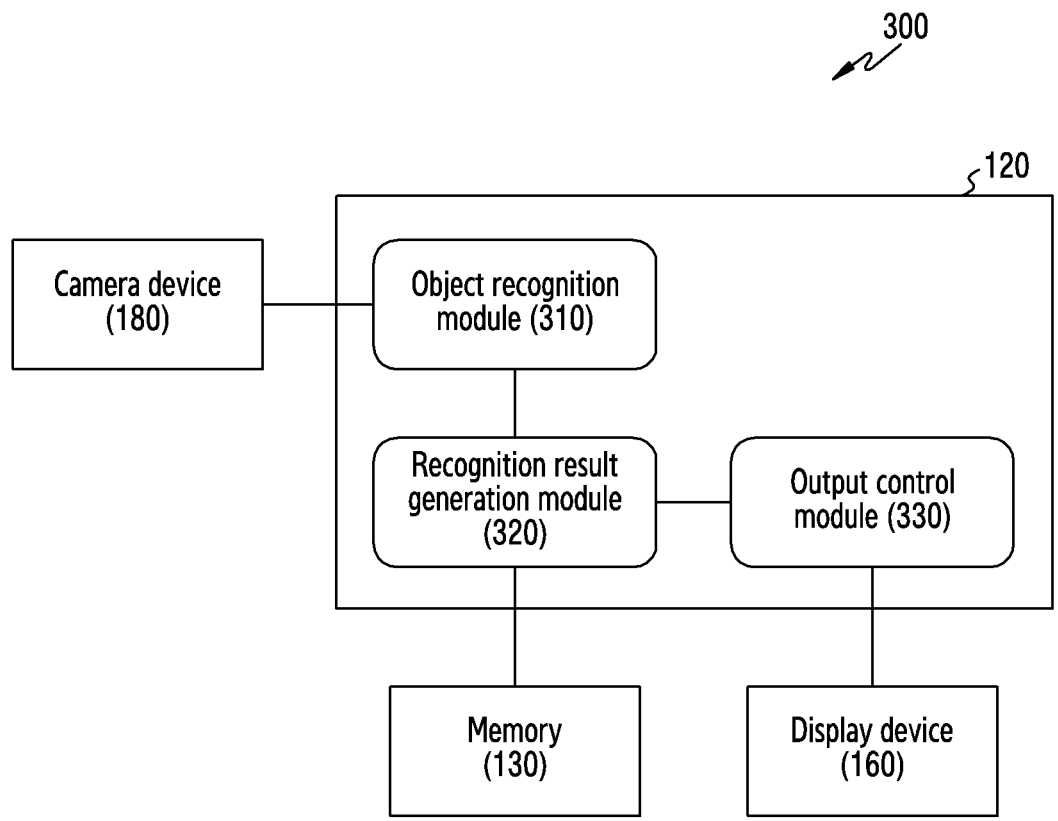
FIG. 3 is a block diagram of a processor according to various embodiments.

FIG. 3 is a block diagram 300 of the processor 120 according to various embodiments.

Referring to FIG. 3, the processor 120 may include an object recognition module 310, a recognition result generation module 320, and an output control module 330.

The object recognition module 310 may perform an operation of recognizing an external object (or an object) included in an image. The image may include a preview image acquired from a camera (e.g., the camera module 180) on a real-time basis or an image or video stored in the electronic device 101 (e.g., the memory 130). The external object may include at least one of a person (or human), an object (e.g., tree, building, road, etc.), and a background (e.g., sky, sea, ground, etc.). However, this is for exemplary purposes only, and the disclosure is not limited thereto. For example, the external object may include various objects included in the image.

According to an embodiment, the object recognition module 310 may compare a feature point extracted from the image and at least one stored feature point template. For example, the object recognition module 310 may calculate a similarity indicating a level of similarity to the extracted feature point for each of the stored feature point templates, and may identify at least one feature point template exceeding a reference similarity. For example, the object recognition module 310 may extract a feature point for an edge, a corner, a contour, or the like by using a Scalar Invariant Feature Transform (SIFT) algorithm, a Speeded Up Robust Feature (SURF) algorithm, or the like. This is for exemplary purposes only, and the embodiment of the disclosure is not limited thereto. Regarding the recognizing of the external object, various known techniques may be used for reference. For example, the object recognition module 310 may recognize the external object by generating a point cloud which is a set of points defining the external object in the form of voxel from a signal reflected from the external object.

According to an embodiment, if the external object is recognized in an image, the object recognition module 310 may identify at least one piece of recognition information for the recognized external object, and may provide this to the recognition result generation module 320. The recognition information may include information on at least one feature point template of which a similarity to the extracted feature point exceeds a reference similarity. For example, the recognition information may be stored in association with the feature point template. For example, the recognition information may be referred to as other terms such as a label, a tag, an identifier, a marker, or the like.

According to an embodiment, the object recognition module 310 may calculate a score for the recognized external object. The score may imply a level corresponding to at least one of a matching rate, matching accuracy, and matching similarity between the extracted feature point and the feature point template. For example, the score may be calculated based on the similarity between the extracted feature point and the feature point template. The calculated score may be provided to the recognition result generation module 320.

The recognition result generation module 320 may generate a recognition result for the external object, in response that the external object included in the image is recognized by the object recognition module 310.

According to an embodiment, the recognition result generation module 320 may acquire related information for each piece of recognition information provided from the object recognition module 310. As illustrated in Table 1 below, the related information may include first related information (e.g., hierarchy information) indicating a hierarchy of recognition information and second related information (e.g., confusion information) indicating a misrecognition result related to recognition information. The related information may be stored in the electronic device 101, or may be provided from another electronic device (e.g., the electronic device 102, the electronic device 104, or the server 108).

TABLE 1

| recognition information | first related information (score) | second related information (score) |
|---|---|---|
| watermelon | watermelon fruit (95) | pumpkin (90) |
| Earth | Earth planet, universe (95) | globe (92) |

For example, referring to Table 1, upon receiving recognition information indicating "watermelon", the recognition result generation module 320 may acquire first related information indicating "fruit" which is a higher hierarchy of "watermelon". In addition, the recognition result generation module 320 may acquire second information indicating that there is a history of confusing "pumpkin" with "watermelon" in a previous external object recognition operation. In a similar manner, upon receiving recognition information indicating "Earth", the recognition result generation module 320 may acquire first related information indicating "planet" and "universe" which are higher hierarchies of the Earth. In addition, the recognition result generation module 320 may acquire second information indicating that there is a history of confusing "globe" with "Earth" in the previous external object recognition operation.

According to an embodiment, the recognition result generation module 320 may generate a recognition result, based on the recognition information provided from the object recognition module 310 and related information for each piece of recognition information. The recognition result may include at least one piece of recognition information and/or at least one piece of related information. For example, the recognition result generation module 320 may acquire a score for each piece of recognition information and each piece of related information, and may determine at least one piece of information (e.g., information satisfying a reference score) to be used for a recognition result, based on the acquired score. The score for the recognition information may be provided from the object recognition module 310. In addition, the score for the related information may include a first score indicating a hierarchy level of the recognition information and a second score indicating a misrecognition rate associated with the recognition information. For example, the score for the related information may be stored inside (e.g., the memory 130) of the electronic device 101 or outside (e.g., the electronic device 102, the electronic device 104, or the server 108) of the electronic device 101 together with the related information, and may be acquired together with the related information as illustrated in Table 1 above.

The output control module 330 may output a recognition result for the generated external object, in response that the recognition result for the external object is generated by the recognition result generation module 320. The recognition result may be output through the electronic device 101 (e.g., the display device 160, the sound output device 155, or the like of FIG. 1).

According to an embodiment, the output control module 330 may determine an output scheme so that at least one piece of information included in the recognition result is distinguished from other information. For example, the output control module 330 may acquire a score for each piece of recognition information and each piece of related information, and may determine the output scheme, based on the acquired score. For example, the output control module 330 may change at least one of an output time, an output size, and an output color of at least one piece of information satisfying a reference score.

As described above, the processor 120 may include the object recognition module 310, the recognition result generation module 320, and the output control module 330, which are separated from one another. However, this is for exemplary purposes only, and the disclosure is not limited thereto. For example, at least two of the object recognition module 310, the recognition result generation module 320, and the output control module 330 may be implemented as one module.

According to various embodiments, an electronic device (e.g., the electronic device 101) may include a camera (e.g., the camera module 180), a display (e.g., the display device 160), a memory (e.g., the memory 130), and a processor (e.g., the processor 120). The processor may be configured to acquire an image including an external object by using the camera, generate recognition information for the external object by using the image, acquire similar recognition information generated together with the recognition information as a recognition result of the external object corresponding to the recognition information before the generating operation, acquire hierarchy information corresponding to the recognition information or the similar recognition information, and provide, by using the display, a recognition result for the external object generated by using at least the recognition information, the similar recognition information, and the hierarchy information.

According to various embodiments, the processor may be configured to acquire the similar recognition information by using a recognition learning database including recognition results for other external objects.

According to various embodiments, the processor may be configured to determine priority information between the recognition information and the similar recognition information, as the recognition result, and provide at least part of the recognition result by using an indication element different from that of at least part other than the at least part of the recognition result, based on the priority information.

According to various embodiments, the processor may be configured to change at least one of an output time, an output size, and an output color, with respect to the at least part of the recognition result.

According to various embodiments, the image may include at least one of a preview image acquired through a camera or the electronic device and an image stored in the electronic device.

According to various embodiments, the processor may be configured to identify a priority for the generated recognition information, and acquire the similar recognition information for recognition information, which satisfies a reference priority, in the acquired recognition information.

According to various embodiments, the processor may be configured to update priority information between the recognition information and the similar recognition information, based on an input for the recognition result.

According to various embodiments, an electronic device (e.g., the electronic device 101) may include a communication circuit (e.g., the communication module 190), a display device (e.g., the display device 160), and a processor (e.g., the processor 120) operatively coupled with the communication circuit and the display device, and a memory (e.g., the memory 130) operatively coupled with the processor. The memory may store instructions, when executed, causing the processor to extract an object included in an image, acquire a first recognition result for the extracted object, request an external device to provide a second recognition result for the extracted object by using the communication circuit, output at least part of the first recognition result through the display device, and output the second recognition result through the display device, based on reception of the second recognition result.

According to various embodiments, the instructions may cause the processor to acquire recognition information for the extracted object, acquire related information for the acquired recognition information, and generate the first recognition result, based on the recognition information and the related information. According to an embodiment, the related information may include at least one of hierarchy information indicating a hierarchy of recognition information and similar recognition information indicating a misrecognition result related to recognition information.

According to various embodiments, the image may include at least one of a preview image acquired through a camera (e.g., the camera module 180) or the electronic device and an image stored in the electronic device.

According to various embodiments, the instructions cause the processor to identify a priority for the generated recognition information, and acquire the similar recognition information for recognition information, which satisfies a reference priority, in the acquired recognition information.

According to various embodiments, the instructions cause the processor to determine at least one piece of information to be used as the recognition result, based on a priority of the recognition information and a priority of the related information.

According to various embodiments, the instructions cause the processor to interrupt displaying of at least part not included in the second recognition result in at least the part of the output first recognition result.

Figure 4A:
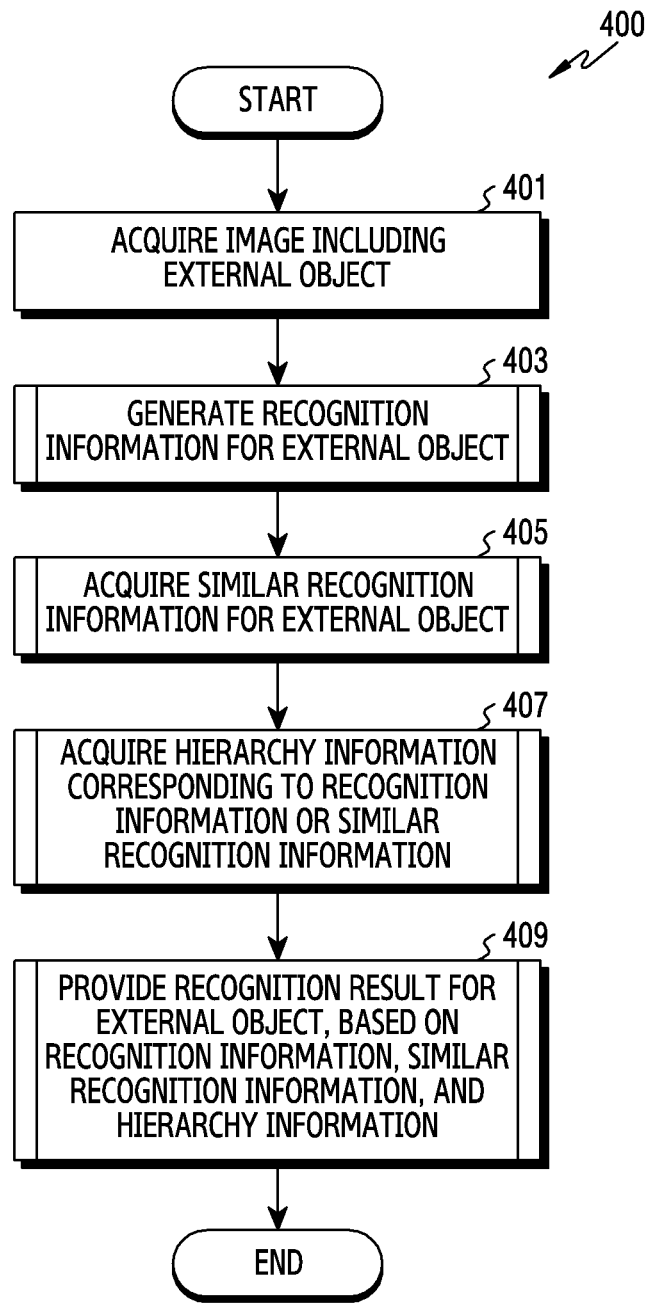
FIG. 4A is a flowchart for recognizing an object included in an image in an electronic device according to various embodiments.
Figure 5:
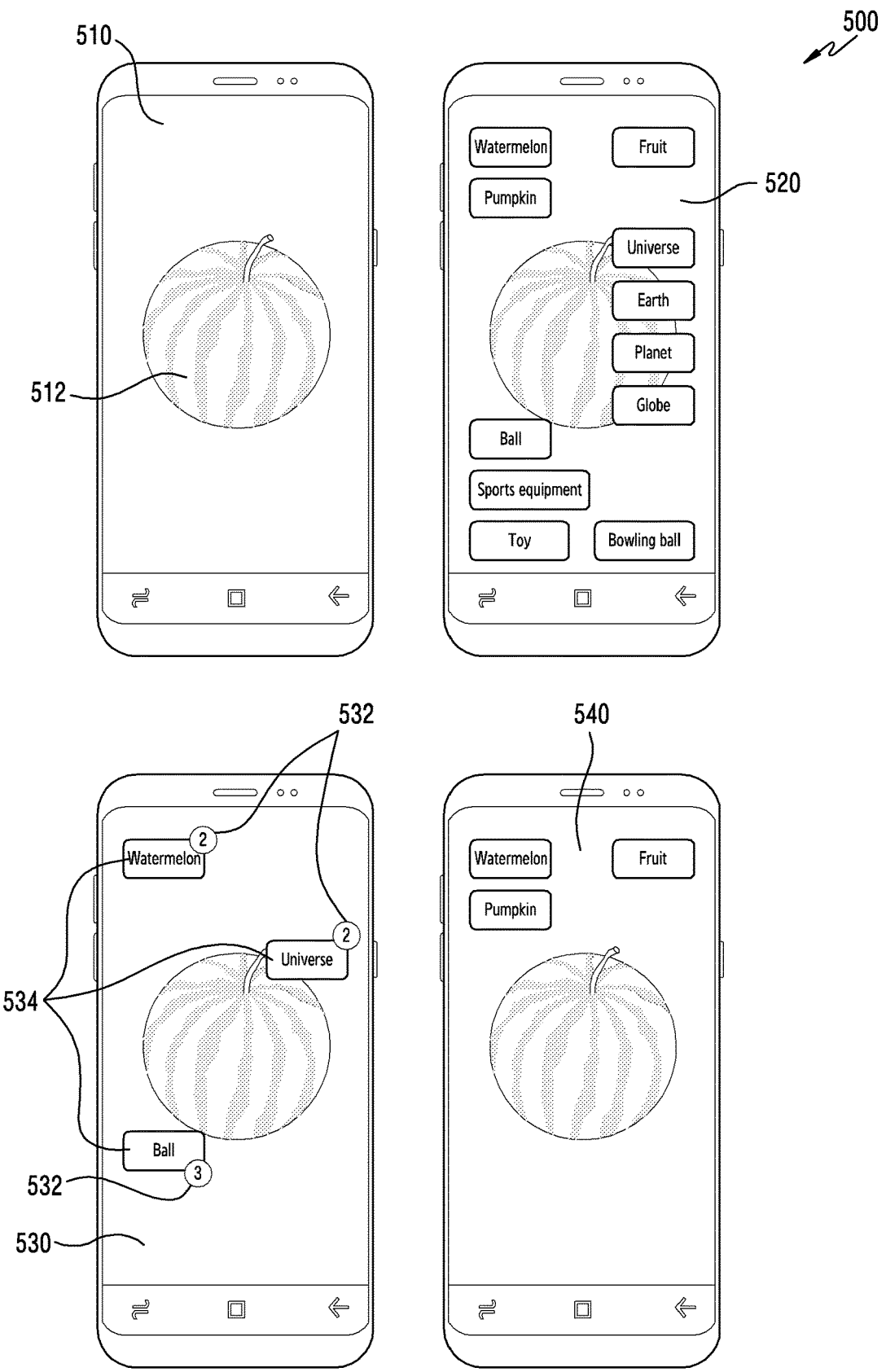
FIG. 5 is a drawing for describing a situation in which an external object recognition result is input according to various embodiments.
Figure 6:
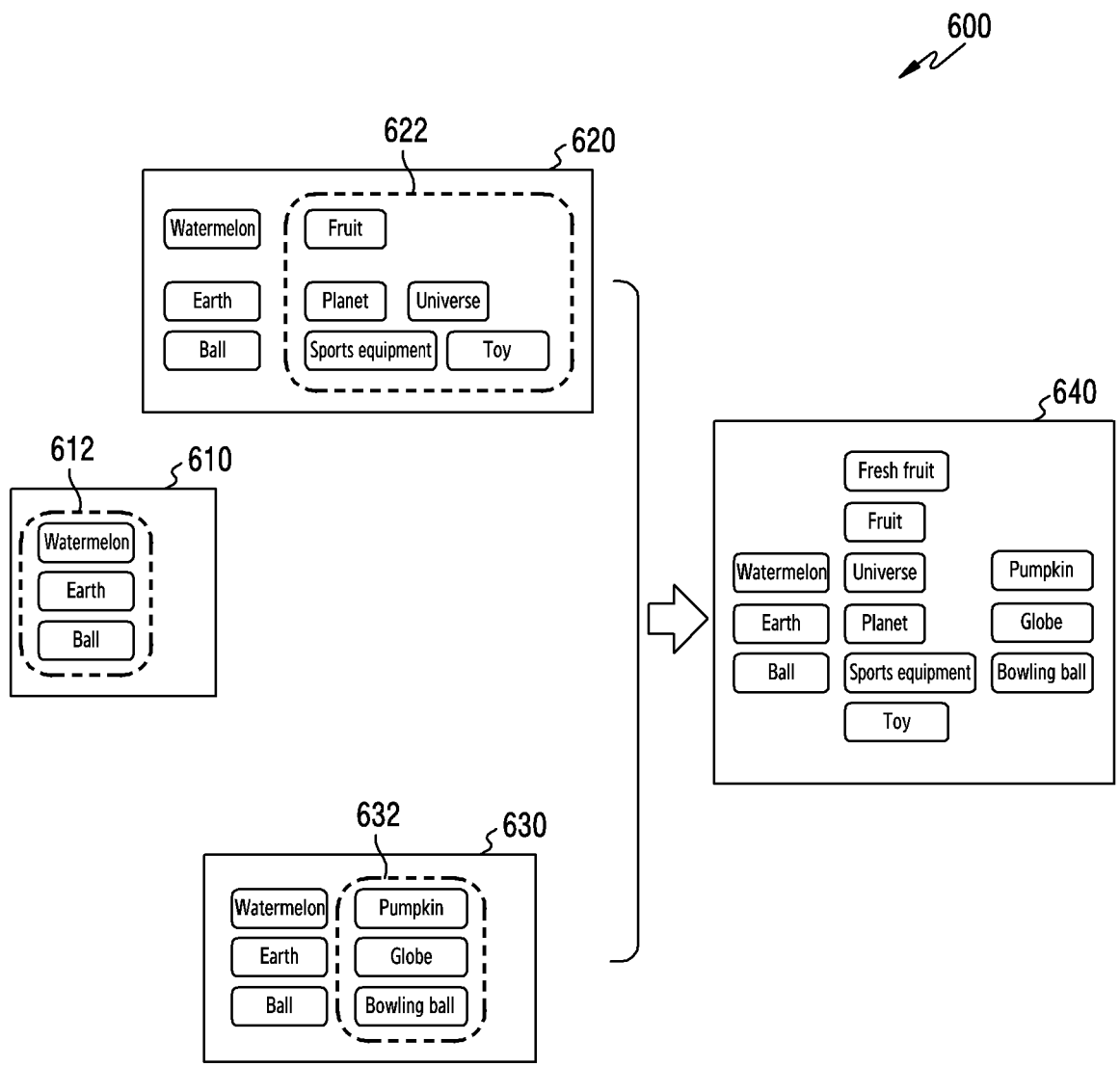
FIG. 6 is a drawing for describing a process in which an external object recognition result is generated according to various embodiments.

FIG. 4A is a flowchart 400 for recognizing an external object (or an object) included in an image in an electronic device according to various embodiments. In addition, FIG. 5 is a drawing for describing a situation 500 in which an external object recognition result is input according to various embodiments, and FIG. 6 is a drawing for describing a process 600 in which an external object recognition result is generated according to various embodiments. In the following embodiment, each of operations may be performed sequentially, but is not necessarily performed sequentially. For example, an order of each of operations may be changed, and at least two operations may be performed in parallel. The electronic device of FIG. 4A may be the electronic device 101 of FIG. 1.

Referring to FIG. 4A, in operation 401, an electronic device (e.g., the processor 120 of FIG. 1) according to various embodiments may acquire an image including at least one external object. As shown in FIG. 5, an image including an external object 512 may include an image 510 (e.g., a preview image) acquired from a camera (e.g., the camera module 180) on a real-time basis. However, this is for exemplary purposes only, and the disclosure is not limited thereto. For example, an image stored inside (e.g., the memory 130) of the electronic device or outside (e.g., the electronic device 102, the electronic device 104, and the server 108) of the electronic device may be output through the display device 160 to acquire the image.

According to various embodiments, in operation 403, the electronic device (e.g., the processor 120) may generate recognition information for the external object 512. The recognition information may be information on at least one feature point template of which a similarity to a feature point corresponding to the external object 512 included in the image 510 exceeds a reference similarity. For example, the recognition information may be stored in association with the feature point template. According to an embodiment, the processor 120 may identify at least one feature point template having a specific level of similarity to a feature point extracted from the image 510, and may acquire recognition information stored in association with the identified feature point template. For example, as indicated by a reference numeral 610 in FIG. 6, the processor 120 may acquire recognition information 612 such as "watermelon", "Earth" and "ball" with respect to an external object "watermelon" included in the image 510.

According to various embodiments, in operation 405, the electronic device (e.g., the processor 120) may acquire similar recognition information for the external object. The similar recognition information may be information indicating a misrecognition result for the external object. For example, the similar recognition information may be referred to as other terms such as confusion information, correlation information, or the like. According to an embodiment, with respect to an external object "watermelon", "Earth", and "ball", the processor 120 may acquire similar recognition information 632 indicating that there is a history (or a misrecognition history) of confusing "pumpkin" with "watermelon", a history of confusing "globe" with "Earth", and a history of confusing "bowling ball" with "ball" in a previous external object recognition operation. The similar recognition information may be acquired from a recognition learning database including a recognition result for another external object. The recognition learning database may be included in the electronic device or the external electronic device.

According to various embodiments, in operation 407, the electronic device (e.g., the processor 120) may acquire hierarchy information corresponding to recognition information or similar recognition information. According to an embodiment, when the processor 120 generates recognition information of "watermelon", "Earth", and "ball" with respect to an external object, as indicated by a reference numeral 620 in FIG. 6, related information indicating "fruit" which is a higher hierarchy of "watermelon", related information "planet" and "universe" which are higher hierarchies of "Earth", and hierarchy information indicating "sports equipment" and "toy" which are higher hierarchies of "ball" may be acquired. According to another embodiment, although not shown, the processor 120 may additionally or alternatively acquire hierarchy information for the similar recognition information 632.

According to various embodiments, in operation 409, the electronic device (e.g., the processor 120) may provide a recognition result for the external object, based on the recognition information, the similar recognition information, and the hierarchy information. The recognition result may include at least one piece of recognition information, at least one piece of similar recognition information, or at least one piece of hierarchy information. According to an embodiment, as indicated by a reference numeral 640 in FIG. 6, the processor 120 may generate all pieces of the recognition information, similar recognition information, and hierarchy information acquired in the external object recognition operation as the recognition result. According to an embodiment, the processor 120 may output the generated recognition result. The recognition result may be output through the display device 160, the sound output device 155, or the like. The processor 120 may output the recognition result on the image 510 (e.g., a preview image) including the external object 512. For example, as shown in FIG. 5, the processor 120 may process every information included in the recognition result to be displayed (see 520). As another example, as shown in FIG. 5, the processor 120 may categorize and display information included in the recognition result. For example, the processor 120 may process only representative information 534 (e.g., "watermelon", "universe", "ball"), which represents a category, to be displayed on a screen (see 530), and may process the remaining information included in each category to be in a hidden state so as not to be displayed on the screen. In this case, information 532 indicating the number of pieces of information processed in the hidden state (e.g., information which is included in the category but not displayed on the screen) may be indicated in at least some pieces of the representative information 534. In addition, upon detecting an input for the representative information 532, the processor 120 may process the information in the hidden state and included in the category of the representative information to be displayed on the screen by transitioning it to an unhidden state.

According to another embodiment, as shown in FIG. 5, the processor 120 may process only the representative information to be displayed on the screen (see 540).

As described above, the electronic device (e.g., the processor 120) may provide the recognition result for the external object, based on the recognition information, the similar recognition information, and the hierarchy information. The similar recognition information and the hierarchy information are information related to the external object, and may be referred to as related information. In addition, the electronic device may provide the recognition result for the external object by using only some pieces (e.g., similar recognition information or hierarchy information) of the related information.

Figure 4B:
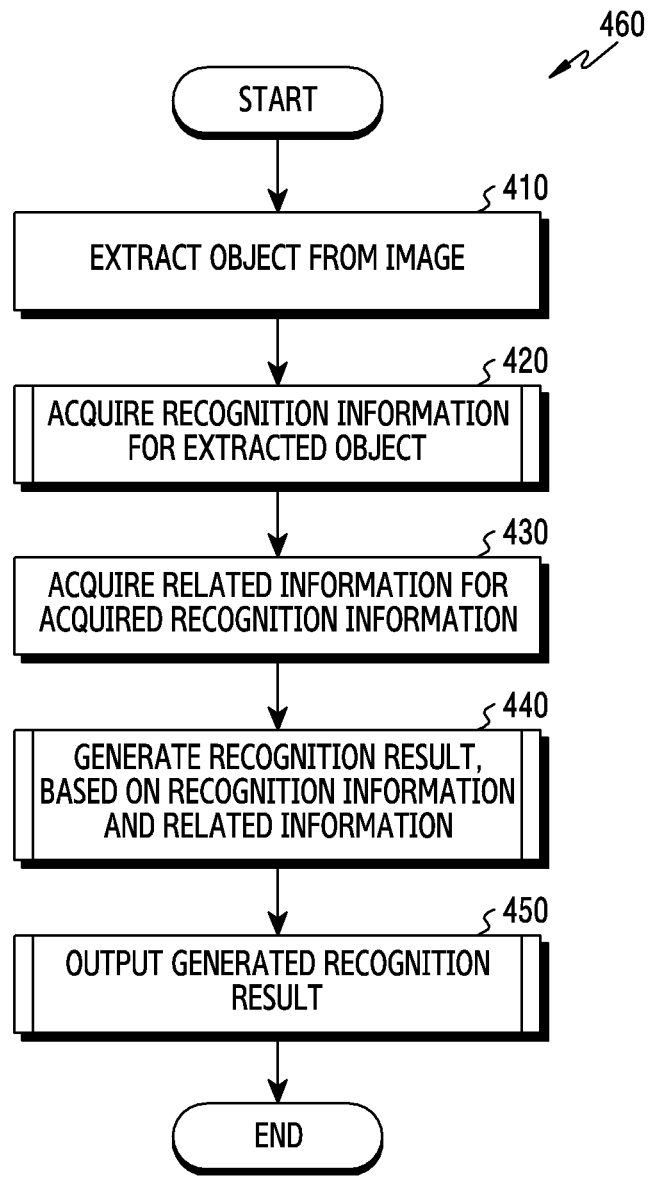
FIG. 4B is a flowchart for recognizing an object included in an image in an electronic device according to various embodiments.

FIG. 4B is a flowchart 460 for recognizing an object included in an image in an electronic device according to various embodiments of the disclosure. In the following embodiment, each of operations may be performed sequentially, but is not necessarily performed sequentially. For example, an order of each of operations may be changed, and at least two operations may be performed in parallel. The electronic device of FIG. 4B may be the electronic device 101 of FIG. 1.

Referring to FIG. 4B, according to various embodiments, in operation 410, the electronic device (e.g., the processor 120 of FIG. 1) may extract an object from an image. As described above with reference to FIG. 5, the object may be extracted from the image 510 acquired from a camera (e.g., the camera module 180) on a real-time basis. Alternatively, the object may also be extracted in a situation in which an image stored in the electronic device (e.g., the memory 130) is output through the display device 160. According to an embodiment, as described above with reference to FIG. 3, the processor 120 may extract the object 512 by comparing a feature point extracted from the image 510 and at least one stored feature point template. The processor 120 may output guide information for the extracted object. For example, the guide information may imply a region of an image including the extracted feature point.

According to various embodiments, in operation 420, the electronic device (e.g., the processor 120) may acquire recognition information for the extracted object 512. The recognition information may be information on at least one feature point template of which a similarity to an extracted feature point exceeds a reference similarity. For example, the recognition information may be stored in association with the feature point template. According to an embodiment, the processor 120 may identify at least one feature point template having a specific level of similarity to a feature point extracted from the image 510, and may acquire recognition information stored in association with the identified feature point template. For example, as indicated by the reference numeral 610 of FIG. 6, the processor 120 may acquire recognition information 612 such as "watermelon", "Earth" and "ball" with respect to an external object "watermelon" included in the image 510.

According to an embodiment, in operation 430, the electronic device (e.g., the processor 120) may acquire related information for the acquired recognition information 612. The related information may include first related information (e.g., hierarchy information) indicating a hierarchy of recognition information and second related information (e.g., similar recognition information or confusion information) indicating a misrecognition result related to recognition information. According to an embodiment, upon receiving "watermelon", "Earth", and "ball" as the recognition information, as indicated by the reference numeral 620 in FIG. 6, the processor 120 may acquire first related information 622 related to "watermelon", "Earth", and "ball". According to another embodiment, as indicated by the reference number 630 of FIG. 6, the processor 120 may acquire the second related information 632 related to "watermelon", "Earth, and "ball".

According to various embodiments, in operation 440, the electronic device (e.g., the processor 120) may generate a recognition result, based on recognition information and related information. The recognition result may include at least one piece of recognition information and/or at least one piece of related information. According to an embodiment, as indicated by the reference number 640 of FIG. 6, the processor 120 may generate all pieces of the recognition information and related information acquired in the object recognition operation as the recognition result.

According to various embodiments, in operation 450, the electronic device (e.g., the processor 120) may output the generated recognition result. The recognition result may be output through the display device 160, the sound output device 155, or the like. According to an embodiment, as described above with reference to FIG. 5, the processor 120 may output the recognition result on the image 510 (e.g., a preview image) including the object 512.

Figure 7:
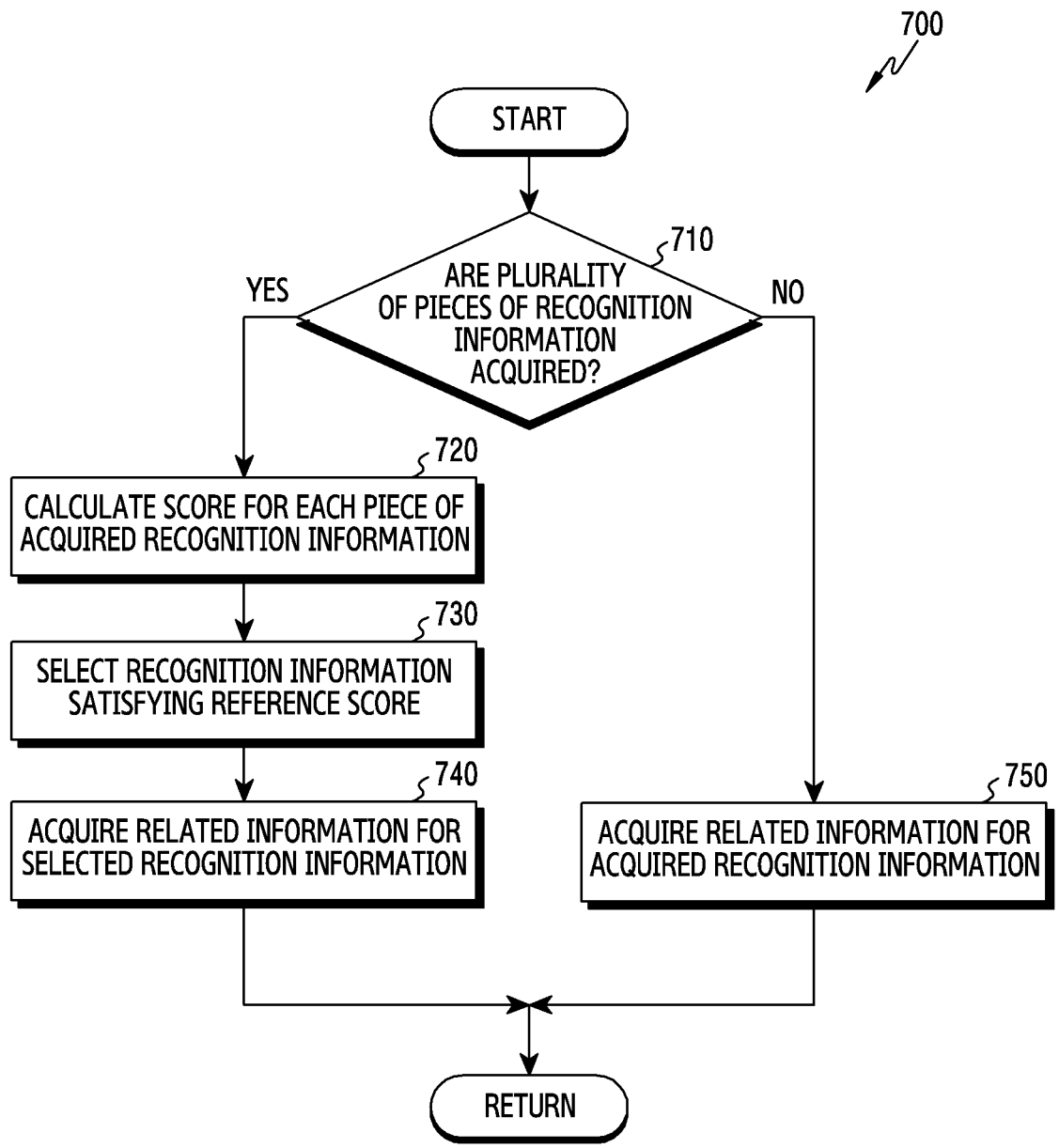
FIG. 7 is a flowchart for acquiring related information in an electronic device according to various embodiments.
Figure 8:
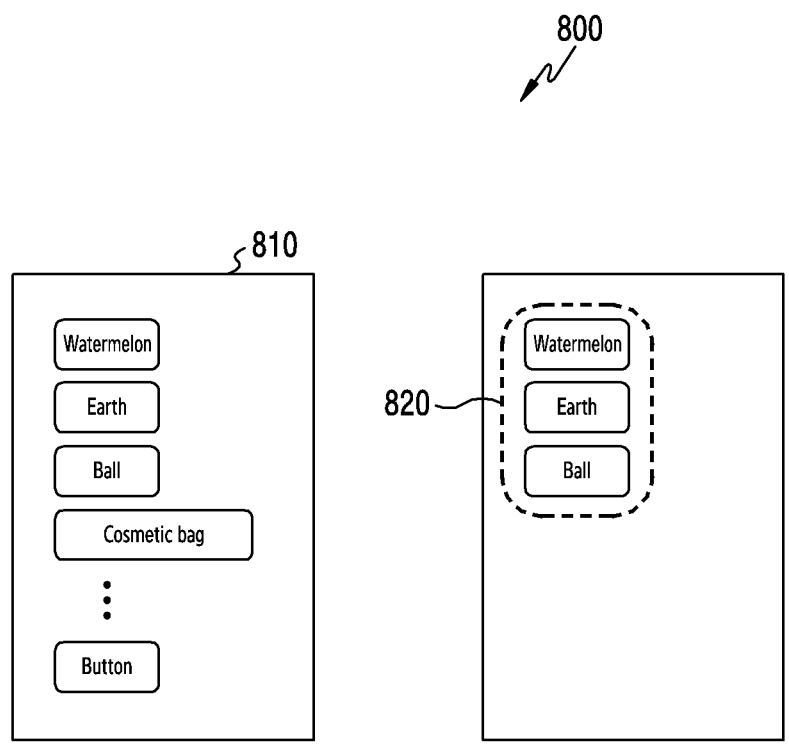
FIG. 8 is a drawing for describing a situation in which related information is acquired according to various embodiments.

FIG. 7 is a flowchart 700 for acquiring related information in an electronic device according to various embodiments. In addition, FIG. 8 is a drawing for describing a situation 800 in which related information is acquired according to various embodiments. Operations of FIG. 7 described hereinafter correspond to various embodiments of the operations 403 to 407 of FIG. 4A and various embodiments of the operation 410 of FIG. 4B. In the following embodiment, each of operations may be performed sequentially, but is not necessarily performed sequentially. For example, an order of each of operations may be changed, and at least two operations may be performed in parallel. The electronic device of FIG. 7 may be the electronic device 101 of FIG. 1.

Referring to FIG. 7, according to various embodiments, in operation 710, the electronic device (e.g., the processor 120 of FIG. 1) may determine whether a plurality of pieces of recognition information corresponding to an extracted external object are acquired.

According to various embodiments, upon acquiring the plurality of pieces of recognition information, in operation 720, the electronic device (e.g., the processor 120) may acquire a score for each piece of the acquired recognition information. The score may imply a level corresponding to at least one of a matching rate, matching accuracy, and matching similarity between an extracted feature point and a feature point template. According to an embodiment, the processor 120 may acquire the score, based on the similarity between the extracted feature point and the feature point template.

According to various embodiments, in operation 730, the electronic device (e.g., the processor 120) may acquire at least one piece of recognition information satisfying a reference score among pieces of the acquired recognition information. The reference score is a reference value used to determine whether the extracted feature point is identical or similar to the feature point template.

According to various embodiments, in operation 740, the electronic device (e.g., the processor 120) may acquire related information for the selected recognition information. According to an embodiment, as shown in FIG. 8, upon acquiring a plurality of pieces of recognition information 810, the processor 120 may acquire related information for only some pieces (e.g., recognition information satisfying the reference score) of the acquired recognition information. Accordingly, compared to a case where the related information is acquired for all pieces of the acquired recognition information, it is possible to prevent the related information from being acquired also for dissimilar recognition information, thereby improving external object recognition performance and decreasing an external object recognition time. This is for exemplary purposes only, and an embodiment of the disclosure is not limited thereto. For example, the processor 120 may acquire related information for all pieces of the acquired recognition information.

According to various embodiments, upon acquiring one piece of recognition information, in operation 750, the electronic device (e.g., the processor 120) may acquire related information for the acquired recognition information.

Figure 9:
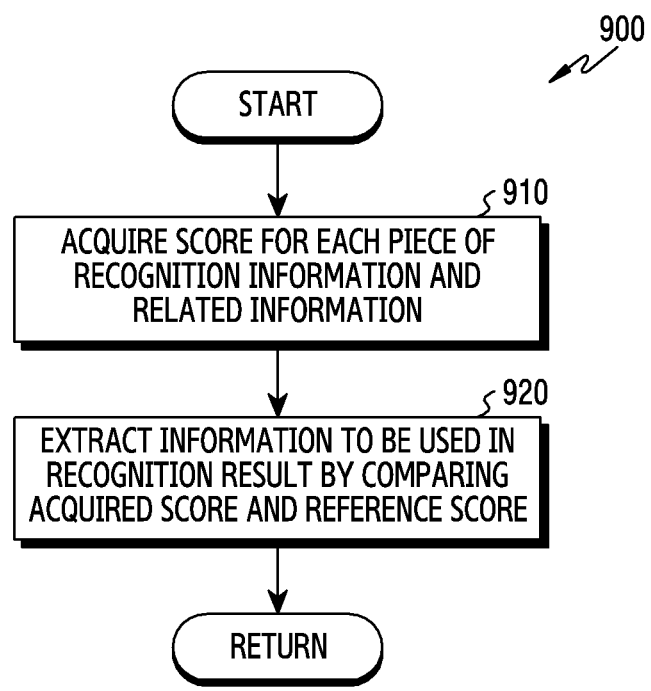
FIG. 9 is a flowchart for generating an object recognition result in an electronic device according to various embodiments.

FIG. 9 is a flowchart 900 for generating an external object (or an object) recognition result in an electronic device according to various embodiments. Operations of FIG. 9 described hereinafter correspond to various embodiments of the operation 409 of FIG. 4A and various embodiments of the operation 440 of FIG. 4B. In the following embodiment, each of operations may be performed sequentially, but is not necessarily performed sequentially. For example, an order of each of operations may be changed, and at least two operations may be performed in parallel. The electronic device of FIG. 9 may be the electronic device 101 of FIG. 1.

Referring to FIG. 9, according to various embodiments, in operation 910, the electronic device (e.g., the processor 120 of FIG. 1) may acquire (or calculate) a score for acquired recognition information and related information. For example, the processor 120 may acquire a priority (e.g., a score) for each piece of recognition information and each piece of related information.

According to various embodiments, in operation 920, the electronic device (e.g., the processor 120) may extract information to be used in a recognition result, based on the acquired score. According to an embodiment, the processor 120 may compare the acquired score and a reference score, and may use only information corresponding to some scores satisfying the reference score in the recognition result if it satisfies the reference score.

Figure 10:
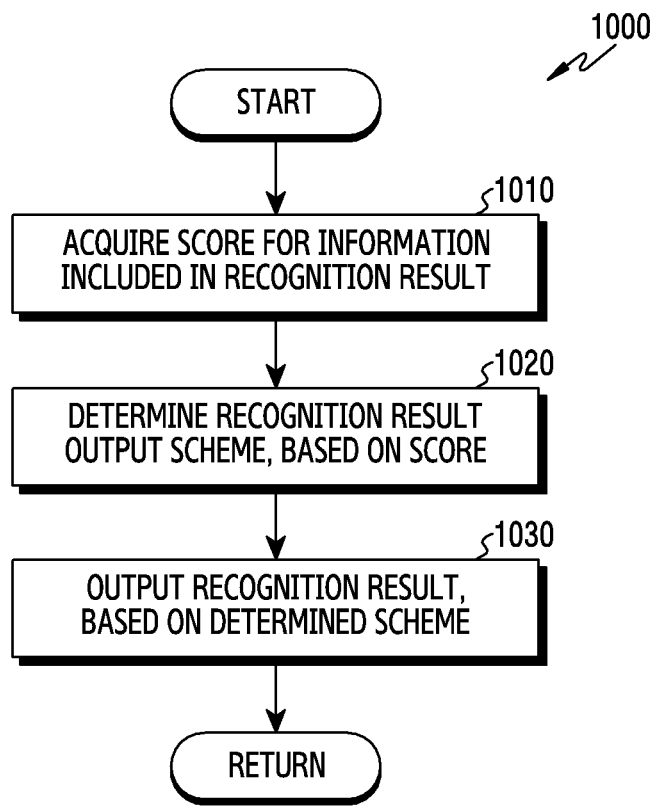
FIG. 10 is a flowchart for providing an object recognition result in an electronic device according to various embodiments.
Figure 11A:
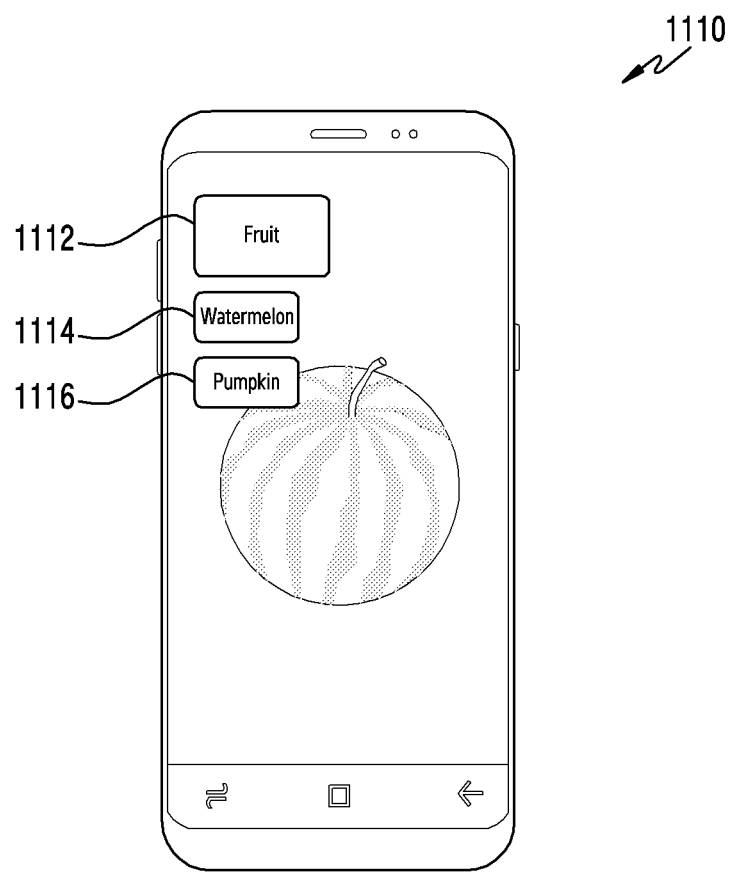
FIG. 11A and FIG. 11B are drawings for describing a scheme of outputting a recognition result according to various embodiments.
Figure 11B:
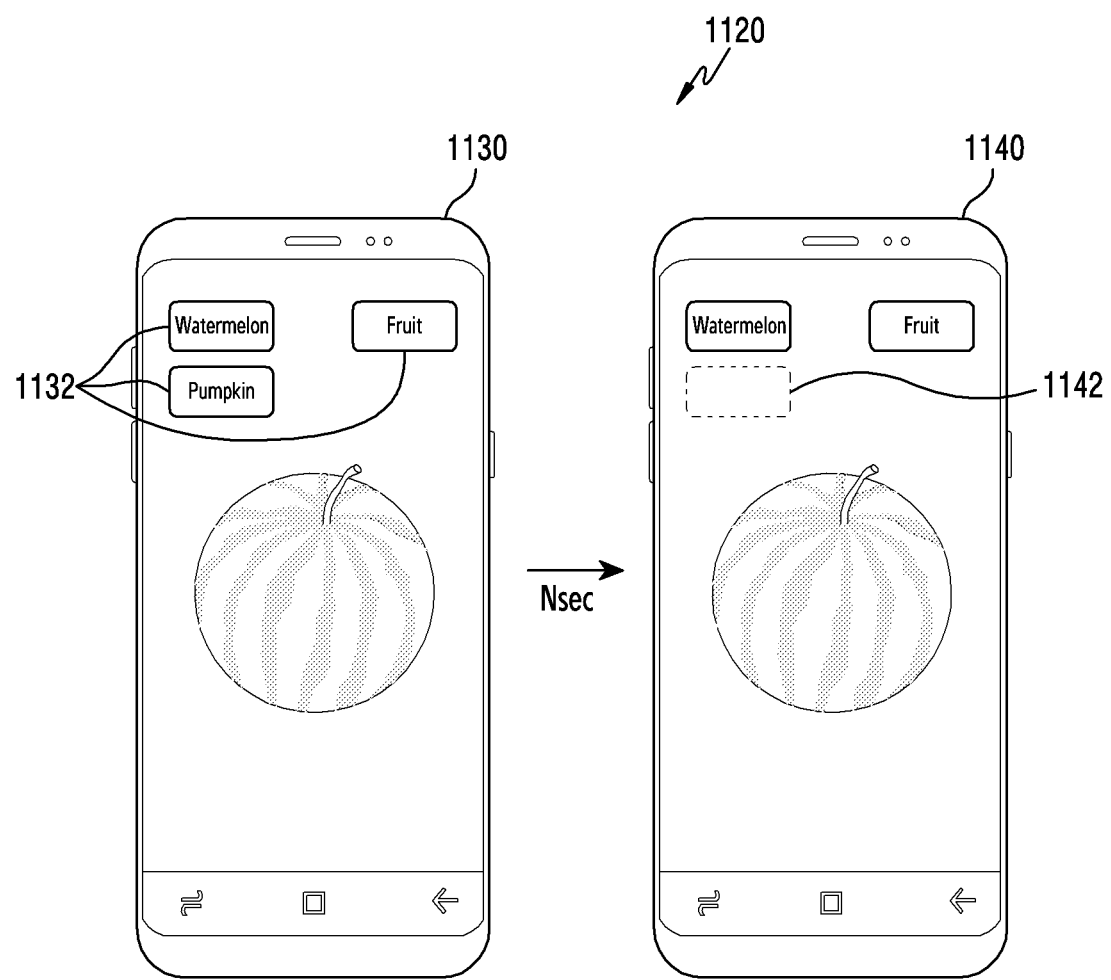

FIG. 10 is a flowchart 1000 for providing an external object (or an object) recognition result in an electronic device according to various embodiments. In addition, FIG. 11A and FIG. 11B are drawings 1110 and 1120 for describing a scheme of outputting a recognition result according to various embodiments. Operations of FIG. 10 described hereinafter correspond to various embodiments of the operation 409 of FIG. 4A and various embodiments of the operation 450 of FIG. 4B. In the following embodiment, each of operations may be performed sequentially, but is not necessarily performed sequentially. For example, an order of each of operations may be changed, and at least two operations may be performed in parallel. The electronic device of FIG. 10 may be the electronic device 101 of FIG. 1.

According to various embodiments, in operation 1010, the electronic device (e.g., the processor 120) may acquire a priority (e.g., a score) for each piece of information included in the recognition result. The score may indicate a similarity level between a recognized external object and the recognition result.

According to various embodiments, in operation 1020, the electronic device (e.g., the processor 120) may determine a recognition result output scheme, based on the score. The output scheme may include various schemes for indicating at least one piece of information satisfying a reference score so as to be identified from another piece of information.

According to an embodiment, the processor 120 may adjust an output size of information included in the recognition result, based on the score. For example, as shown in FIG. 11A, first information 1112 (e.g., fruit) having a highest score is output with a first size, and the remaining information 1114 and 1116 (e.g., second information and third information) are output with a second size (see 1110). This is for exemplary purposes only, and an embodiment of the disclosure is not limited thereto. For example, the processor 120 may process the first information 1112, the second information 1114, and the third information 1116 to be output respectively with the first size, the second size, and a third size.

According to another embodiment, the processor 120 may adjust an output time of the information included in the recognition result, based on the score. For example, as shown in FIG. 11B, when a specific time (e.g., N sec) elapses after outputting a recognition result including a plurality of pieces of recognition information 1132 is output (see 1130), it may be processed that an output of information 1142 (e.g., third information) having a lowest score is interrupted.

According to various embodiments, in operation 1030, the electronic device (e.g., the processor 120) may output the recognition result, based on the determined scheme. For example, the processor 120 may output the recognition result in the same manner as in FIG. 11A or FIG. 11B based on the determined scheme. However, this is for exemplary purposes only, and the disclosure is not limited thereto. For example, the processor 120 may output the recognition result by using a color corresponding to a score order.

In the present embodiment, a configuration is described in which an output scheme of a recognition result is determined based on a score for information included in the recognition result. However, this is for exemplary purposes only, and the disclosure is not limited thereto. For example, the output scheme of the recognition result may be determined based on the number of pieces of information included in the recognition result. For example, if the number of pieces of recognition information included in the recognition result is relatively greater than the number of pieces of related information, the recognition information included in the recognition result may be output in a highlighted manner. On the contrary, if the number of pieces of recognition information included in the recognition result is relatively less than the number of pieces of related information, the related information included in the recognition result may be output in a highlighted manner.

Figure 12:
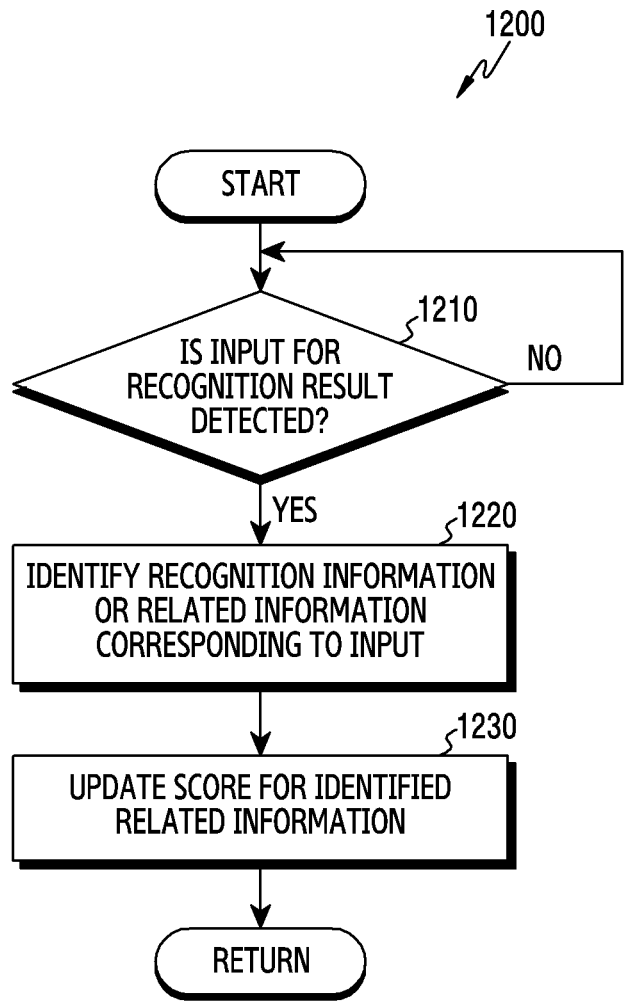
FIG. 12 is a flowchart for updating a score for related information in an electronic device according to various embodiments.

FIG. 12 is a flowchart 1200 for updating a score for related information in an electronic device according to various embodiments. Operations of FIG. 10 described hereinafter correspond to various embodiments of the operation 409 of FIG. 4A and various embodiments of the operation 450 of FIG. 4B. In the following embodiment, each of operations may be performed sequentially, but is not necessarily performed sequentially. For example, an order of each of operations may be changed, and at least two operations may be performed in parallel. The electronic device of FIG. 12 may be the electronic device 101 of FIG. 1.

Referring to FIG. 12, according to various embodiments, in operation 1210, the electronic device (e.g., the processor 120 of FIG. 1) may determine whether an input for a recognition result is detected. The input may be an input (e.g., a touch input, a voice input, etc.) designating at least one piece of information (e.g., recognition information or related information) included in the recognition result.

According to various embodiments, if the input is not detected, the electronic device (e.g., the processor 120) may repeatedly perform an operation of detecting the input for the recognition result.

According to various embodiments, upon detecting the input, in operation 1220, the electronic device (e.g., the processor 120) may identify recognition information or related information corresponding to the input. For example, the processor 120 may identify at least one piece of information designated by the input among pieces of information included in the recognition result.

According to various embodiments, in operation 1230, the electronic device (e.g., the processor 120 of FIG. 1) may update a score for the identified related information. The score may be updated in response to occurrence of an additional operation (e.g., a search operation) for a recognized external object. According to an embodiment, if an additional operation occurs, the processor 120 may determine that the designated information is a final recognition result, and may update a score for the designated information.

Figure 13:
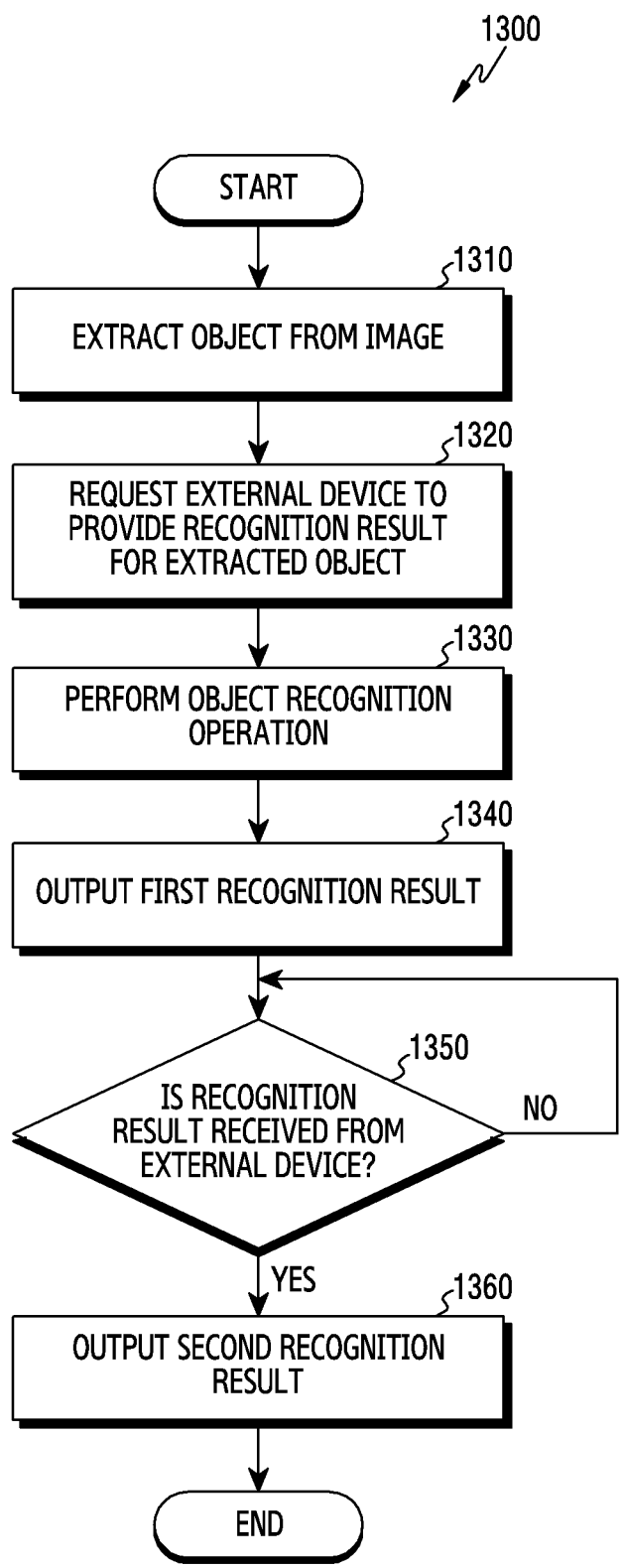
FIG. 13 is a flowchart for recognizing an object included in an image in an electronic device according to various embodiments.
Figure 14:
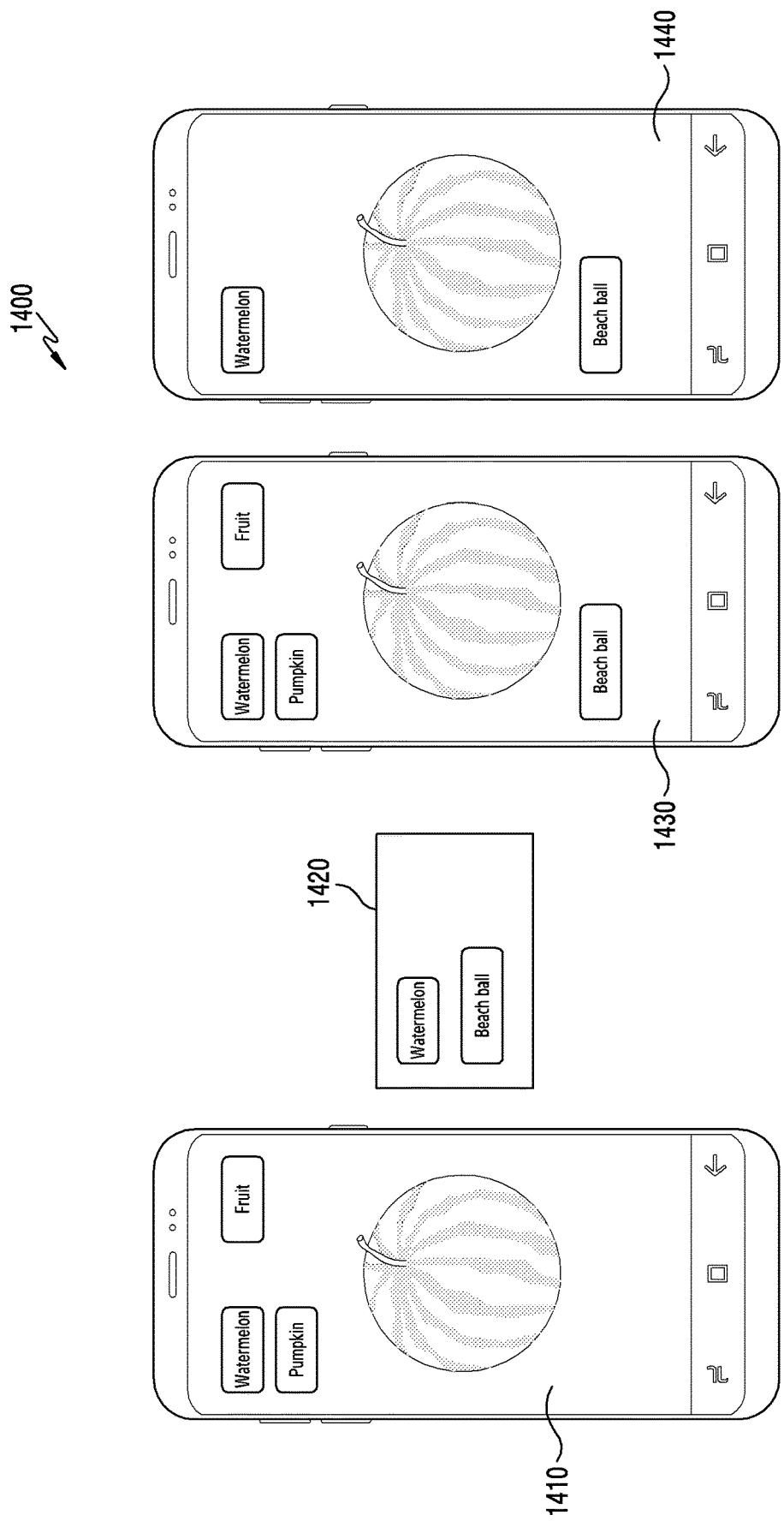
FIG. 14 is a drawing for describing a situation in which an external object recognition result is output according to various embodiments.

FIG. 13 is a flowchart 1300 for recognizing an external object (or an object) included in an image in an electronic device according to various embodiments. In addition, FIG. 14 is a drawing for describing a situation 1400 in which an external object recognition result is output according to various embodiments. In the following embodiment, each of operations may be performed sequentially, but is not necessarily performed sequentially. For example, an order of each of operations may be changed, and at least two operations may be performed in parallel. The electronic device of FIG. 13 may be the electronic device 101 of FIG. 1.

Referring to FIG. 13, according to various embodiments, in operation 1310, the electronic device (e.g., the processor 120 of FIG. 1) may extract an external object from an image. The external object may be extracted from a preview image acquired from a camera (e.g., the camera module 180) on a real-time basis. According to an embodiment, the processor 120 may extract some regions of an image including a feature point as the external object.

According to various embodiments, in operation 1320, the electronic device (e.g., the processor 120) may request an external device to provide a recognition result for the extracted external object. According to an embodiment, the processor 120 may transmit the extracted external object to the external device, and may request for the recognition result for the transmitted external object.

According to various embodiments, in operation 1330, the electronic device (e.g., the processor 120) may perform an operation of recognizing the extracted external object. The operation of recognizing the external object may include an operation of acquiring recognition information for the extracted external object and related information corresponding to the recognition information. According to an embodiment, in order to recognize the external object, the processor 120 may perform operations identical or similar to the aforementioned operations 420 to 440 of FIG. 4B.

According to various embodiments, in operation 1340, the electronic device (e.g., the processor 120) may output a first recognition result for the extracted external object. The first recognition result may be an external object recognition result generated by the electronic device. According to an embodiment, in order to output the first recognition result, the processor 120 may perform an operation identical or similar to the aforementioned operation 405 of FIG. 4A.

According to various embodiments, in operation 1350, the electronic device (e.g., the processor 120) may determine whether a second recognition result is received from the external device. The second recognition result may be an external object recognition result generated by the external device (e.g., the electronic device 102, the electronic device 104, or the server 108). In addition, the second recognition result may be a recognition result having a higher accuracy than the first recognition result.

According to various embodiments, if the second recognition result is not received, the electronic device (e.g., the processor 120) may perform whether the second recognition result is received. According to an embodiment, the processor 120 may maintain an output of the first recognition result until the second recognition result is received.

According to various embodiments, if the second recognition result is received, in operation 1360, the electronic device (e.g., the processor 120) may output the received second recognition result. According to an embodiment, as shown in FIG. 14, if the second recognition result is received (see 1420) in a situation in which the first recognition result is output (see 1410), the processor 120 may output the first recognition result and the second recognition result (see 1430). In this case, the first recognition result and the second recognition result may be output distinctively. For example, the second recognition result having a higher accuracy than the first recognition result may be output in a highlighted manner. However, this is for exemplary purposes only, and the disclosure is not limited thereto. For example, as shown in FIG. 14, if the second recognition result is received (see 1420) in a situation in which the first recognition result is output (see 1410), the processor 120 may interrupt an output of the first recognition result and may output only the received second recognition result (see 1440).

Figure 15:
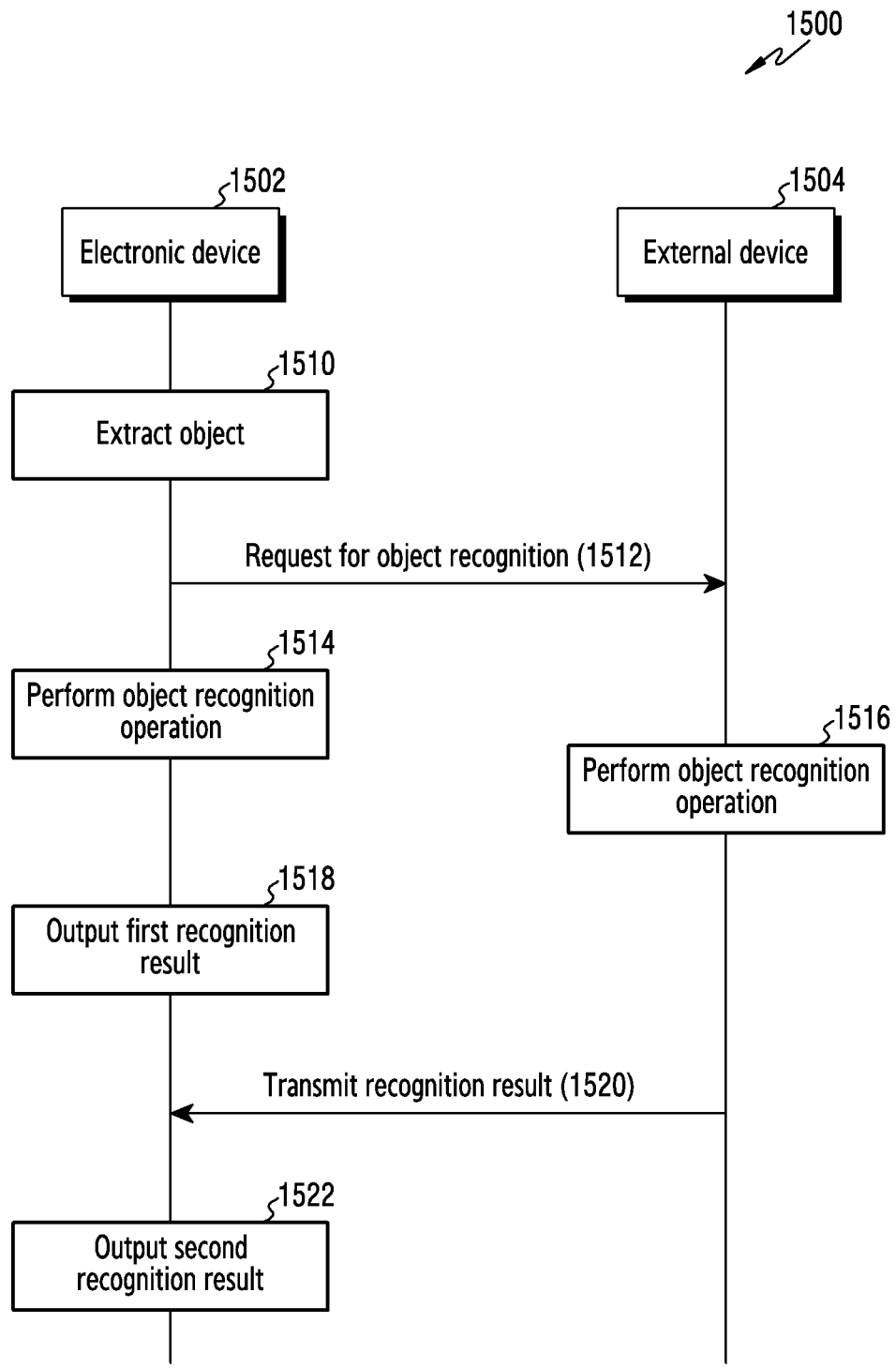
FIG. 15 is a drawing illustrating an operation of recognizing an external object included in an image in a system according to various embodiments.

FIG. 15 is a drawing illustrating an operation 1500 of recognizing an external object included in an image in a system according to various embodiments. In the following embodiment, each of operations may be performed sequentially, but is not necessarily performed sequentially. For example, an order of each of operations may be changed, and at least two operations may be performed in parallel.

As shown in FIG. 15, the system according to various embodiments may include an electronic device 1502 and an external device 1504, and the external device 1504 may be a server for recognizing an external object. According to an embodiment, the electronic device 1502 may be the electronic device 101 of FIG. 1, and the external device 1504 may include at least one of the electronic device 102, electronic device 104, and server 108 of FIG. 1.

Referring to FIG. 15, in operation 1510, the electronic device 1502 may extract an external object from an image. According to an embodiment, in response that a function related to external object recognition is executed, at least one external object may be extracted from a preview image acquired from a camera (e.g., the camera module 180) on a real-time basis.

In operation 1512, the electronic device 1502 may request the external device 1504 to recognize the external object. According to an embodiment, the electronic device 1502 may request to recognize the external object by transmitting the extracted external object to the external device 1504.

In operation 1514, the electronic device 1502 may perform an operation of recognizing the extracted external object. The operation of recognizing the external object may include an operation of acquiring recognition information for the extracted external object and related information corresponding to the recognition information and generating a first recognition result, based on the acquired information.

In operation 1516, the external device 1504 may perform an operation of recognizing the external object, in response that an external object recognition request is received. The operation of recognizing the external object may include an operation of acquiring recognition information for the external object provided from the electronic device 1502 and related information corresponding to the recognition information and generating a second recognition result, based on the acquired information.

In operation 1518, the electronic device 1502 may output the generated first recognition result. The first recognition result may be output through a display device (e.g., the display 160 of FIG. 1) of the electronic device 1502.

In operation 1520, the external device 1504 may transmit the generated second recognition result to the electronic device 1502.

In operation 1522, the electronic device 1502 may output the second recognition result received from the external device 1504. As shown in FIG. 14, the second recognition result may be output together with the first recognition result.

According to various embodiments, a method of operating an electronic device (e.g., the electronic device 101) may include acquiring an image including an external object, generating recognition information for the external object by using the image, acquiring similar recognition information generated together with the recognition information as a recognition result of the external object corresponding to the recognition information before the generating operation, acquiring hierarchy information corresponding to the recognition information or the similar recognition information, and providing a recognition result for the external object generated by using at least the recognition information, the similar recognition information, and the hierarchy information.

According to various embodiments, the similar recognition information may be acquired from a recognition learning database including recognition results for other external objects.

According to various embodiments, the providing of the recognition result may include determining priority information between the recognition information and the similar recognition information, as the recognition result, and providing at least part of the recognition result by using an indication element different from that of at least part other than the at least part of the recognition result, based on the priority information.

According to various embodiments, the providing of the at least part by using the different indication element may include changing at least one of an output time, an output size, and an output color, with respect to at least part of the recognition result.

According to various embodiments, the image may include at least one of a preview image acquired through a camera or the electronic device and an image stored in the electronic device.

According to various embodiments, the acquiring of the similar recognition information may include identifying a priority for the generated recognition information, and acquiring the similar recognition information for recognition information, which satisfies a reference priority, in the acquired recognition information.

According to various embodiments, the method of operating the electronic device may further include updating priority information between the recognition information and the similar recognition information, based on an input for the recognition result.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The invention claimed is:

1. An electronic device comprising:
a camera;
a display;
a memory; and
a processor, wherein the processor is configured to:
acquire an image comprising an external object by using the camera;
generate recognition information for the external object by using the image;
acquire similar recognition information generated together with the recognition information as a recognition result of the external object corresponding to the recognition information before the generating operation;
determine priority information between the recognition information and the similar recognition information, as the recognition result;
acquire hierarchy information corresponding to the recognition information or the similar recognition information; and
provide, by using the display, a recognition result for the external object generated by using at least the recognition information, the similar recognition information, and the hierarchy information,
wherein at least part of the recognition result is provided by using an indication element different from that of at least part other than the at least part of the recognition result, based on the priority information.

2. The electronic device of claim 1, wherein the processor is configured to acquire the similar recognition information by using a recognition learning database comprising recognition results for other external objects.

3. The electronic device of claim 1, wherein the processor is configured to change at least one of an output time, an output size, and an output color, with respect to the at least part of the recognition result.

4. The electronic device of claim 1, wherein the image comprises at least one of a preview image acquired through the camera of the electronic device or an image stored in the electronic device.

5. The electronic device of claim 1, wherein the processor is configured to update the priority information between the recognition information and the similar recognition information, based on an input for the recognition result.

6. The electronic device of claim 1, wherein the processor is configured to:
   request an external device to provide an additional recognition result for the external object; and
   output the additional recognition result to be received, together with the recognition result.

7. A method of operating an electronic device, the method comprising:
   acquiring an image comprising an external object;
   generating recognition information for the external object by using the image;
   acquiring similar recognition information generated together with the recognition information as a recognition result of the external object corresponding to the recognition information before the generating operation;
   determining priority information between the recognition information and the similar recognition information, as the recognition result;
   acquiring hierarchy information corresponding to the recognition information or the similar recognition information;
   providing a recognition result for the external object generated by using at least the recognition information, the similar recognition information, and the hierarchy information,
   wherein at least part of the recognition result is provided by using an indication element different from that of at least part other than the at least part of the recognition result, based on the priority information.

8. The method of claim 7, wherein the similar recognition information is acquired from a recognition learning database comprising recognition results for other external objects.

9. The method of claim 7, wherein the providing of the at least part by using the different indication element comprises changing at least one of an output time, an output size, and an output color, with respect to at least part of the recognition result.

10. The method of claim 7, wherein the image comprises at least one of a preview image acquired through a camera of the electronic device or an image stored in the electronic device.

11. The method of claim 7, further comprising updating the priority information between the recognition information and the similar recognition information, based on an input for the recognition result.

* * * * *